United States Patent
Burg et al.

(10) Patent No.: US 9,440,661 B2
(45) Date of Patent: Sep. 13, 2016

(54) INTEGRATED CEILING ASSEMBLY FOR RAILCARS

(71) Applicant: SIEMENS INDUSTRY, INC., Alpharetta, GA (US)

(72) Inventors: Wilhelm Burg, Bamberg (DE); John Maranski, Folsom, CA (US); Manish Patel, Sacramento, CA (US); Mario Schuh, Sacramento, CA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 14/464,144

(22) Filed: Aug. 20, 2014

(65) Prior Publication Data

US 2015/0251668 A1    Sep. 10, 2015

Related U.S. Application Data

(60) Provisional application No. 61/948,989, filed on Mar. 6, 2014.

(51) Int. Cl.

| | |
|---|---|
| *B61D 17/00* | (2006.01) |
| *B61D 27/00* | (2006.01) |
| *B61D 29/00* | (2006.01) |
| *B61D 1/00* | (2006.01) |
| *B29C 47/00* | (2006.01) |
| *B61D 17/12* | (2006.01) |
| *B61D 17/18* | (2006.01) |
| *B29L 31/30* | (2006.01) |

(52) U.S. Cl.
CPC ............... *B61D 17/00* (2013.01); *B29C 47/00* (2013.01); *B61D 1/00* (2013.01); *B61D 17/12* (2013.01); *B61D 17/18* (2013.01); *B61D 27/00* (2013.01); *B61D 29/00* (2013.01); *B29L 2031/3011* (2013.01); *B29L 2031/3064* (2013.01)

(58) Field of Classification Search
CPC .................... B62D 33/048; B29L 2031/3011; B29L 2031/3064; B17D 17/00; B17D 17/005; B17D 17/04; B17D 17/12
USPC .................................................. 52/17, 45–46
See application file for complete search history.

(56) References Cited

U.S. PATENT DOCUMENTS

| | | | |
|---|---|---|---|
| 1,133,335 A * | 3/1915 | Summers | 52/466 |
| 2,406,863 A * | 9/1946 | Swann | 52/462 |

(Continued)

FOREIGN PATENT DOCUMENTS

| | | |
|---|---|---|
| DE | 102009058413 A1 | 6/2011 |
| EP | 1808365 A1 | 7/2007 |

(Continued)

OTHER PUBLICATIONS

PCT International Search Report mailed May 22, 2015 corresponding to PCT International Application No. PCT/US2015/019171 filed Mar. 6, 2015 (5 pages).

*Primary Examiner* — Beth Stephan

(57) ABSTRACT

A ceiling assembly for a vehicle includes a plurality of supporting elements for fastening components, and a plurality of connecting elements connecting the supporting elements. The plurality of connecting elements is integrally designed with the plurality of the supporting elements forming an integrated ceiling assembly. Further, a vehicle and a method for manufacturing a ceiling assembly to a ceiling of a vehicle are disclosed.

13 Claims, 3 Drawing Sheets

(56) References Cited

U.S. PATENT DOCUMENTS

| | | | | |
|---|---|---|---|---|
| 2,612,028 | A | * | 9/1952 | Schnabel .................... 62/273 |
| 2,645,521 | A | * | 7/1953 | Judson .................... 296/185.1 |
| 2,921,814 | A | * | 1/1960 | Mede ........................ 296/215 |
| 2,925,050 | A | * | 2/1960 | Candlin, Jr. et al. ......... 105/397 |
| 3,035,161 | A | * | 5/1962 | Kalt ........................ 362/479 |
| 3,210,875 | A | * | 10/1965 | Schwenkler ........... B60Q 3/025 |
| | | | | 362/479 |
| 3,408,779 | A | * | 11/1968 | Allen et al. .................... 52/53 |
| 3,823,518 | A | * | 7/1974 | Allen ........................ 52/53 |
| 4,076,166 | A | * | 2/1978 | Austill ........................ 228/157 |
| 4,088,881 | A | * | 5/1978 | Neer et al. .................... 362/223 |
| 4,157,584 | A | * | 6/1979 | Bhatt ........................ 362/479 |
| 4,319,528 | A | * | 3/1982 | Gutridge et al. ............. 105/397 |
| 4,353,313 | A | * | 10/1982 | Panagin ........................ 105/397 |
| 4,387,415 | A | * | 6/1983 | Domas .................... B60Q 3/025 |
| | | | | 362/151 |
| 4,574,336 | A | * | 3/1986 | Mikalonis ............... B60Q 3/025 |
| | | | | 362/151 |
| 4,891,737 | A | * | 1/1990 | Szymanek ................ F21V 3/02 |
| | | | | 362/223 |
| 4,891,954 | A | * | 1/1990 | Thomsen .................... 62/239 |
| 5,066,067 | A | * | 11/1991 | Ferdows .................. 296/193.04 |
| 5,113,322 | A | * | 5/1992 | Mikalonis ............... B60Q 3/025 |
| | | | | 362/224 |
| 5,201,432 | A | * | 4/1993 | Elvin-Jensen ................ 220/1.5 |
| 5,292,282 | A | * | 3/1994 | Callas .................... F24F 13/08 |
| | | | | 454/292 |
| 5,336,849 | A | * | 8/1994 | Whitney ................ E04F 17/08 |
| | | | | 174/101 |
| 5,347,434 | A | * | 9/1994 | Drake ........................ 362/472 |
| 5,441,326 | A | * | 8/1995 | Mikalonis .......... B60H 1/00371 |
| | | | | 105/325 |
| 5,601,034 | A | * | 2/1997 | Tao et al. ...................... 105/423 |
| 5,857,758 | A | * | 1/1999 | Dealey, Jr. ............. B60Q 3/004 |
| | | | | 362/223 |
| 5,916,093 | A | * | 6/1999 | Fecko et al. ...................... 52/17 |
| 6,065,261 | A | * | 5/2000 | Fehr .................... B61D 17/005 |
| | | | | 105/401 |
| 6,082,879 | A | * | 7/2000 | Myburgh ............... B60Q 3/025 |
| | | | | 362/253 |
| 6,238,075 | B1 | * | 5/2001 | Dealey, Jr. ............. B60Q 3/004 |
| | | | | 362/223 |
| 6,336,411 | B1 | * | 1/2002 | Bell ............................ 105/404 |
| 6,416,116 | B1 | * | 7/2002 | Stanton ............... B60H 1/00371 |
| | | | | 105/461 |
| 6,827,472 | B1 | * | 12/2004 | Myburgh ........... B60H 1/00371 |
| | | | | 362/125 |
| 7,134,711 | B1 | * | 11/2006 | Yoder ........................ 296/210 |
| 7,438,001 | B2 | * | 10/2008 | Nakamura et al. ........... 105/396 |
| 7,748,172 | B2 | * | 7/2010 | Zupancich et al. ................ 52/55 |
| 7,766,276 | B2 | * | 8/2010 | Buchholz et al. ............. 244/119 |
| 2006/0207471 | A1 | * | 9/2006 | Todori ............... B60H 1/00371 |
| | | | | 105/396 |
| 2012/0102846 | A1 | * | 5/2012 | Assel .................... B61D 17/18 |
| | | | | 52/45 |

FOREIGN PATENT DOCUMENTS

| | | | | |
|---|---|---|---|---|
| JP | EP 1702825 A2 | * | 9/2006 | ......... B60H 1/00371 |
| JP | 4071270 B1 | | 4/2008 | |
| JP | 2012250703 A | * | 12/2012 | |
| WO | 2012110045 A1 | | 8/2012 | |

* cited by examiner

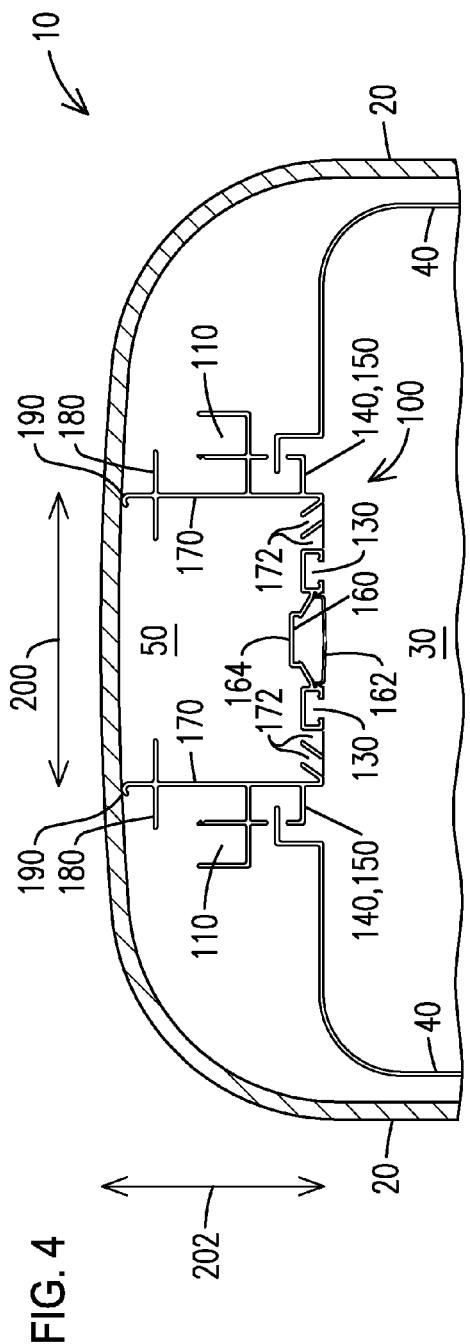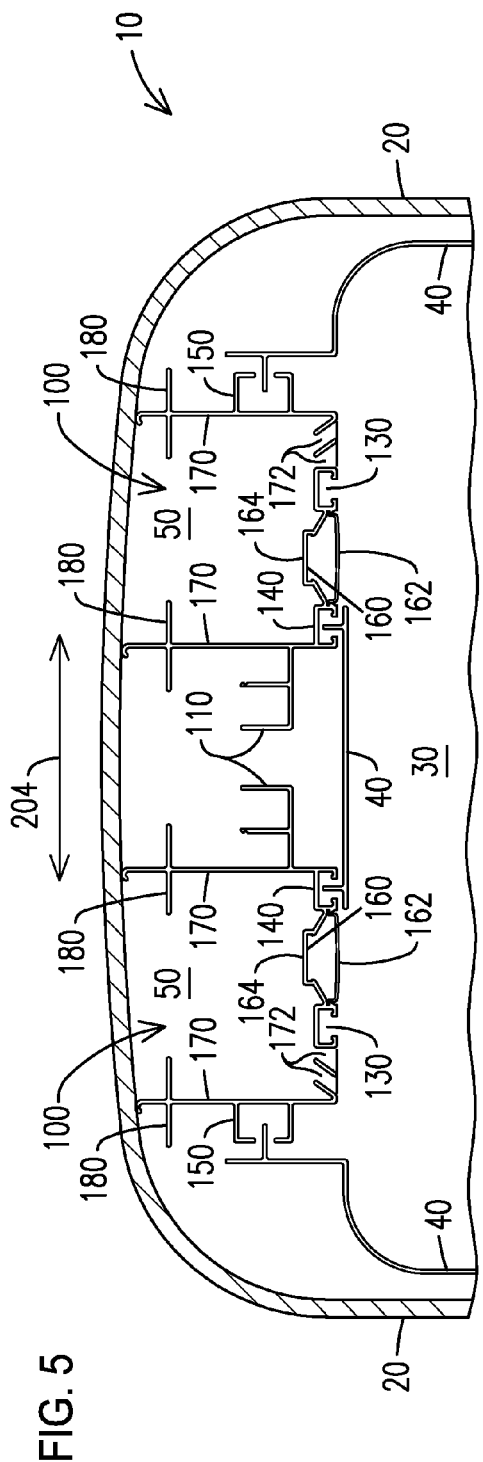

INTEGRATED CEILING ASSEMBLY FOR RAILCARS

CROSS REFERENCE TO RELATED APPLICATION

This application claims benefit, under 35 U.S.C. §119(e), of U.S. Provisional Application No. 61/948,989, filed Mar. 6, 2014, the entire contents and substance of which is hereby incorporated by reference.

BACKGROUND

1. Field

Aspects of the present invention relate to a ceiling assembly for vehicles, for example for a railcar.

2. Description of the Related Art

The ceiling inside vehicles, like for example railcars and coaches, fulfills several functions like air distribution, integration of lights and speakers, means to mount stanchions and handrails, means to mount ceiling panels and thermal insulation, cable ducts, etc. Ceiling assemblies are normally made out of many different parts mounted together like C-rails, holders, brackets, light fixtures, cable ducts, etc. The parts get either assembled inside of the vehicle or (partly) pre-assembled and then installed in the vehicle. It is a lot of effort to buy, handle, install and adjust the different parts. Furthermore, the length of the ceiling can vary from 3 m to 12 m in for example Light Rail Vehicles and until about 40 m in coaches. This creates another challenge to align the visual parts of the ceiling to get a straight nice surface. For example, the air duct is either formed by the parts and panels which creates the need to seal off any gaps, e.g. with aluminum foil, or it is formed by additional sheet metal or fabric parts.

An improved ceiling assembly for a vehicle is desired.

SUMMARY

Briefly described, aspects of the present invention relate to an integrated ceiling assembly for a vehicle. Such vehicles can be for example railcars like streetcars, light rail vehicles, automatic (airport) shuttles, metros, commuter trains, EMUS (Electric Multiple Units), DMUs (Diesel Multiple Unit), coaches, and high speed trains. Furthermore, such vehicles can also be for example coaches or busses or many other vehicles for passenger transportation.

A first aspect of the invention provides a ceiling assembly for a vehicle comprising a plurality of supporting elements for fastening components to the supporting elements. A plurality of connecting elements connects the supporting elements directly or indirectly to each other. The connecting elements are integrally designed with the supporting elements such that an integrated ceiling assembly is formed. The components which can be fastened to the supporting elements are necessary components in a vehicle, for example a railway vehicle, and can be for example mechanical and/or electrical components, for example air distribution components, lighting installation, loudspeakers (audio equipment), stanchions, handrails, ceiling panels, thermal insulation components, cables etc. The means for mounting components comprise for example C-rails, flanges, holders, brackets, ducts (cable ducts), housings etc.

A second aspect of the invention provides a vehicle comprising an integrated ceiling assembly as described herein.

A third aspect of the invention provides a method for manufacturing a ceiling assembly, the method comprising extruding an integrated ceiling assembly as described herein.

BRIEF DESCRIPTION OF THE DRAWINGS

FIG. 4 shows a schematic representation of a cross-section through a vehicle body with an integrated ceiling assembly in accordance with a further exemplary embodiment of the present invention.

FIG. 5 shows a schematic representation of a cross-section through a vehicle body with an integrated ceiling assembly in accordance with a further exemplary embodiment of the present invention.

DETAILED DESCRIPTION

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
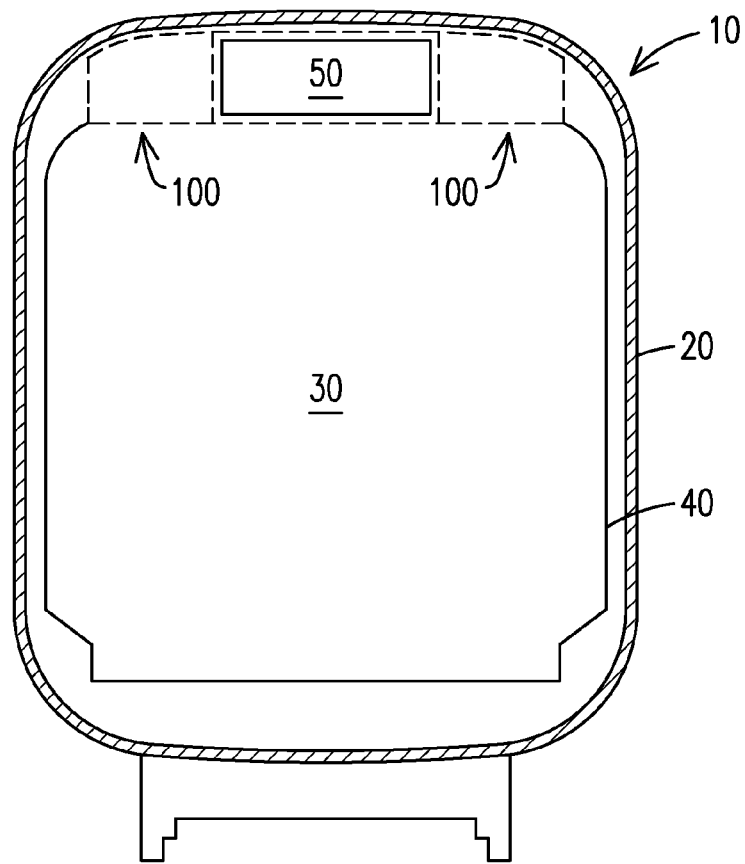
FIG. 1 shows a schematic representation of a cross-section through a vehicle body, for example a railcar body, in accordance with an exemplary embodiment of the present invention.

FIG. 1 shows a schematic representation of a cross-section through a railcar body 10, the cross-section being perpendicular to a longitudinal axis of the railcar body 10, in accordance with an exemplary embodiment. The railcar body 10 comprises a body shell 20 having an interior room 30 with interior panelling 40. The railcar body 10 further comprises an air duct 50 within a ceiling region of the railcar body 10. The air duct 50 can be located in the middle of the ceiling region. Adjacent to the air duct 50, for example on the left side and/or right side of the air duct 50, a ceiling assembly 100 can be arranged. The interior panelling 40 can be connected to the ceiling assembly 100. The ceiling assembly 100 is only shown schematically in FIG. 1 and will be described in detail in FIG. 2.

Figure 2:
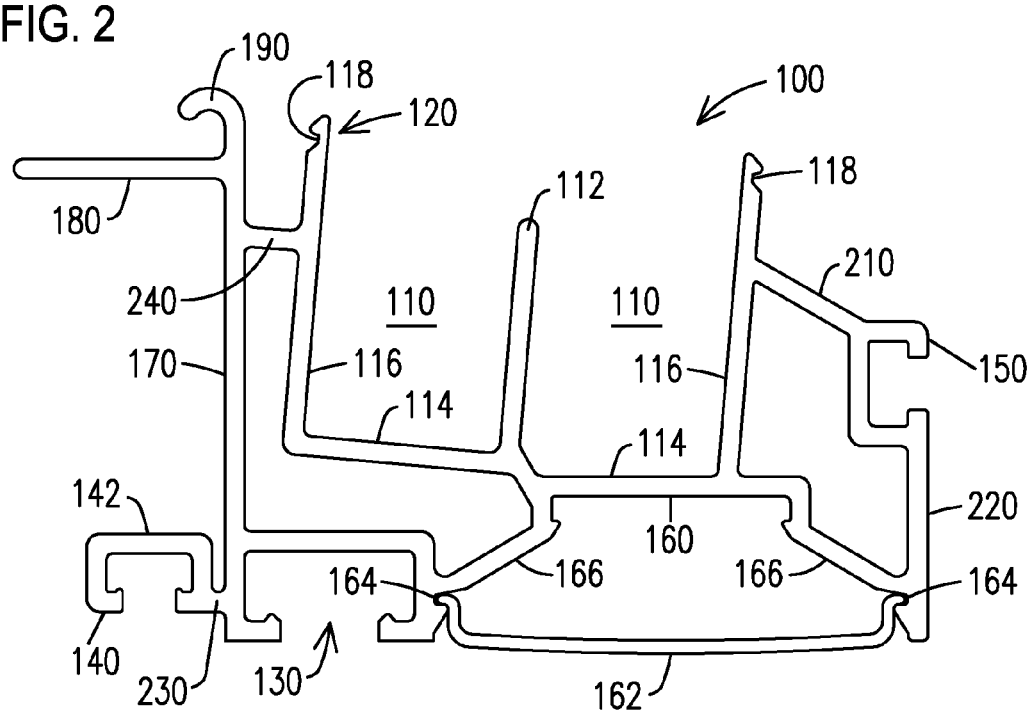
FIG. 2 shows a cross-section of an integrated ceiling assembly in accordance with an exemplary embodiment of the present invention.

FIG. 2 shows a cross-section of an integrated ceiling assembly 100 in accordance with an exemplary embodiment. The integrated ceiling assembly 100 is manufactured as a one-piece component. The integrated ceiling assembly 100 can comprise for example aluminium and can be for example an aluminum extrusion. Aluminum provides a light-weight structure which is important for a ceiling assembly. Furthermore, aluminum is easily machined and extruded. The ceiling assembly 100 can comprise many other materials, for example stainless steel or for example plastics, like polyamide or polyvinyl chloride (PVC).

The integrated ceiling assembly 100 runs along a length of a railcar ceiling and covers many functions of a ceiling assembly. Mounting the ceiling assembly 100 as a one-piece component to the ceiling provides less effort for installing and aligning the assembly. In a further embodiment, the ceiling assembly can be mounted to the ceiling in a modular manner, for example a plurality of assembly modules are mounted to the ceiling adjacent to each other forming the ceiling assembly 100. The integrated ceiling assembly 100 can be cut into individual assembly modules according to a desired length. Individual assembly modules provide easier handling in case that the ceiling or roof region of the vehicle needs to be accessed for repair or maintenance and/or the ceiling assembly needs to be removed.

The integrated ceiling assembly 100 includes many functions which can be selected according to requirements of the vehicle. In an exemplary embodiment, the ceiling assembly comprises a plurality of supporting elements 110, 120, 130, 140, 150, 160, 170, 180, 190 which provide holding functions (can receive and hold mechanical and/or electrical components) or which provide fastening or mounting functions.

The ceiling assembly 100 further comprises a plurality of connecting elements 210, 220, 230, 240 which connect the supporting elements directly or indirectly to each other. The connecting elements are integrally designed with the supporting elements forming an integrated ceiling assembly 100. The plurality of supporting elements comprises at least one flange for mounting the integrated ceiling assembly 100 to ceiling structures of a vehicle, wherein the flange is further configured to form a part, which is an upper surface, of a ceiling air duct of the vehicle, for example of the air duct 50 as shown in FIG. 1.

The ceiling assembly 100 can comprise for example one or more cable ducts 110 for housing different types of cables, for example power cables or network cables, like fiber optic cables, for a communication network of the railcar. The ceiling assembly 100 as shown in FIG. 2 comprises two cable ducts 110 adjacent to each other. The ceiling assembly 100 is extruded such that the cable ducts 110 substantially form a central part (or middle-piece) of the assembly 100. The two cable ducts 110 share a common side wall 112 between the two cable ducts 110. Each cable duct 110 has a bottom wall 114 and another side wall 116.

The ceiling assembly 100 can further comprise means 120 for clipping on one or more cable duct covers, for example an off-the-shelf cable duct cover. In an exemplary embodiment, the side walls 116 of the cable ducts 110 comprise an end, wherein the ends form the means 120. For example, the ends are formed such that they can comprise a grooving or recess 118 which are used to clip on the one or more cable duct covers. Other means for attaching a cover can comprise for example a bore or a hole provided in the ends of the side walls 116 for attaching a cover via a screw or bolt.

The ceiling assembly 100 can further comprise a plurality of C-rails 130, 140 and 150. For example, the ceiling assembly 100 can comprise one or more C-rails 130 to attach different components like stanchions, handrails, and monitors for PIS (Passenger Information System) and the like. The opening of the C-rail 130 can be provided such that the different components can be easily mounted to the C-rail 130. The C-rail 130 is designed such that its opening faces outwards with respect to the ceiling assembly 100, for example towards a bottom of the interior room 30.

The ceiling assembly 100 can further comprise one or more C-rails and/or flanges 140 to attach center aisle ceiling panels of the interior room 30. The one or more C-rails 140 are configured such that, in addition to their function of mounting ceiling panels, they form a lower surface 142 of the air duct 50 (see FIG. 1). In an exemplary embodiment, the C-rails and/or flanges 140 are located next to the C-rail 130 wherein the elements 130 and 140 are connected via the connecting element 230. An opening of the C-rail 140 also faces outwards in respect of the assembly 100, for example towards a bottom of the interior room 30. In another exemplary embodiment, the ceiling assembly 100 can be designed such that the C-rail 140 is located below the wall 170. In this case, the C-rail 140 does not form a part of the air duct 50. Alternatively, ceiling panels for the vehicle body can be mounted below the air duct for example without an extra C-rail, for example without the C-rail 140.

The ceiling assembly 100 can further comprise one or more C-rails and/or flanges 150 to attach side ceiling panels or corner hatches of the interior room 30 of the railway body 10. As shown for example in FIG. 1, the interior panelling 40 is connected to the ceiling assembly 100. For example, the interior panelling 40 can be attached to the C-rail 150. The C-rails and/or flanges 150 are arranged so that the opening of the C-rail faces outwards with respect to the assembly 100, for example towards a side wall of the interior room 30. The C-rail 150 is connected via the connecting element 210 to one of the cable ducts 110.

The C-rail 150 is next to the cable ducts 110. Also next to the cable ducts 110, but on the other side, a vertical wall 170 can form a side wall of the air duct 50. The wall 170 is directly connected to a flange 180 to mount the ceiling assembly 100 to ceiling structures (also referred to as roof structures) of the vehicle body 10. The flange 180 can further be used to clamp-on roof insulation, which than forms an upper surface of the air duct 50 (see FIG. 1). The ceiling assembly 100 can be designed such that the wall 170 and the flange 180 are arranged perpendicular to each other. The ceiling assembly can also be designed such that the wall 170 and the flange 180 are arranged with a different angle to each other, for example smaller or greater than 90°, or the wall 170 and the flange 180 can be arranged in a curve. The wall 170 is mechanically connected to one of the side walls 116 of one of the cable ducts 110 via the connecting element 240. In another exemplary embodiment, the ceiling assembly 100 may not comprise the flange 180. In this case, the ceiling assembly 100 can be mounted to ceiling structures of the vehicle body via a C-rail, for example the C-rail 150. The ceiling assembly 100 can also comprise hangers or brackets or a mounting flange designed at a different location of the ceiling assembly 100, for example far from the air duct area of the vehicle body 10.

In an exemplary embodiment, to ease installation, the ceiling assembly 100 can comprise means 190 for attaching the ceiling assembly 100 to roof structures of the vehicle body 10 before the ceiling assembly 100 can be fastened, for example bolted, on to the roof structures. For example, the means 190 can be configured as a hook in order to hook the ceiling assembly 100 to the roof structures.

In an exemplary embodiment, the integrated ceiling assembly 100 can comprise a housing 160 to install lights, e.g. LED strips, and optionally speakers, and the like. Furthermore, in order to attach a cover 162, for example a translucent cover, to the housing 160, the ceiling assembly 100 can comprise grooving or recesses 164. The housing 160 is formed by a top wall, wherein the bottom wall 114 of one of the cable ducts 110 can form the top wall of the housing 160. Further, the housing 160 comprises two side walls 166 which are opposite to each other and can be connected to each other via the bottom wall 114. One of the side walls 166 can be connected to the connecting element 220 on one end and to the bottom wall 114 on the other end. The other side wall 166 can be connected to the C-rail 130 on one end and to the bottom wall 114 on its other end. The connecting element 220 and/or the C-rail 130 can each comprise the grooving or recess 164 for attaching the cover 162.

Figure 3A:
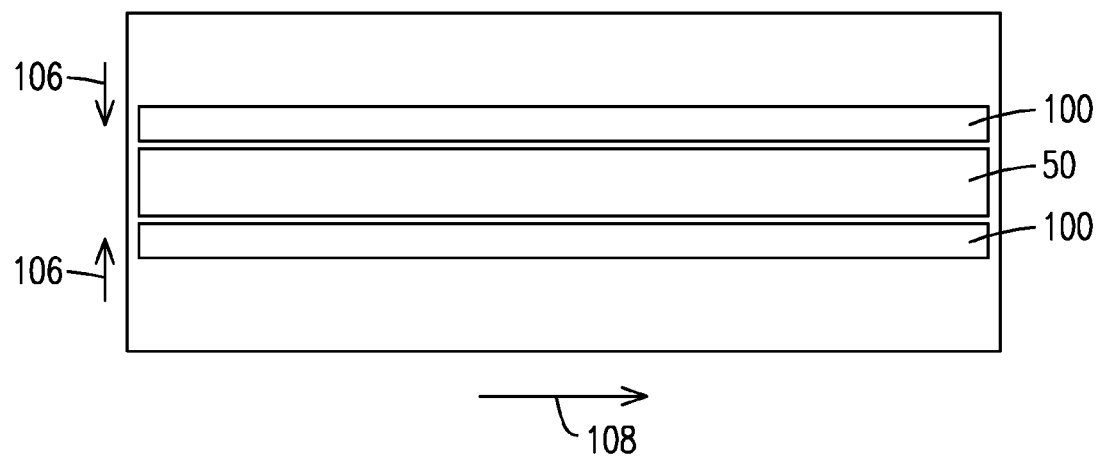
FIG. 3a and FIG. 3b each show a schematic representation of an integrated ceiling assembly arranged within a vehicle body in accordance with an exemplary embodiment of the present invention.
Figure 3B:
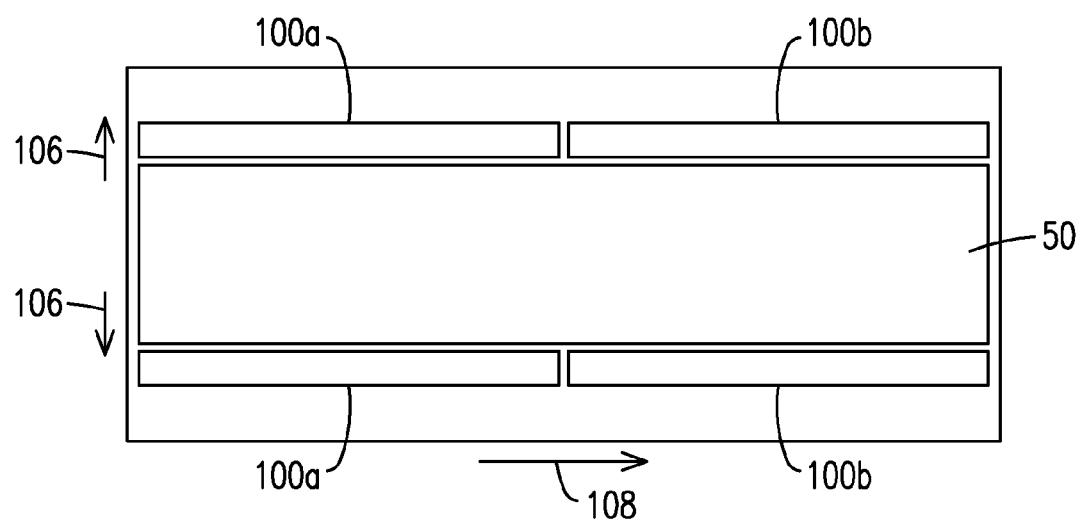

FIG. 3*a* and FIG. 3*b* each show a schematic representation of a cross-section through a railcar body 10 parallel to a longitudinal direction 108 with an integrated ceiling assembly 100 arranged within a railcar body 10 in accordance with an exemplary embodiment of the present invention. The integrated ceiling assembly 100 runs along a length of a vehicle ceiling. The air duct 50 can be arranged centrally in the ceiling region of the vehicle. Two ceiling assemblies 100 can run along the length of the vehicle ceiling on sides of the air duct 50. The ceiling assemblies 100 run along a longitudinal direction 108 of the vehicle ceiling in parallel to the air duct 50. By mounting the ceiling assemblies 100 further apart or together, as indicated by the arrows 106, a flexible aisle ceiling panel and air duct width can be provided. For example, in FIG. 3*a*, the air duct 50 has a smaller width than the air duct 50 of FIG. 3*b*. The assemblies 100 can simply be moved and mounted further together (FIG. 3*a*) or further apart (FIG. 3*b*).

According to FIG. 3*a*, the ceiling assembly 100 can run along a full length of the railcar ceiling in one-piece. Mounting the ceiling assembly 100 in one piece to the ceiling provides less effort for installing and aligning the assembly. In a further embodiment according to FIG. 3*b*, the ceiling assembly 100 can be mounted to the ceiling in a modular manner. For example a plurality of assembly modules 100*a* and 100*b* can be mounted to the ceiling adjacent to each other. Individual assembly modules 100*a*, 100*b* provide easier handling in case that the ceiling region and/or roof region of the vehicle needs to be accessed for repair or maintenance and/or the ceiling assembly 100 needs to be removed.

FIG. 4 shows a schematic representation of a cross-section through an upper section of a vehicle body 10, for example a railcar body, the cross-section being perpendicular to a longitudinal axis of the vehicle body 10, with an integrated ceiling assembly 100 in accordance with a further exemplary embodiment of the present invention. The vehicle body 10 comprises a body shell 20 with interior panelling 40.

The vehicle body 10 further comprises an integrated ceiling assembly 100, wherein the ceiling assembly 100, when mounted to a ceiling region of the body 10, forms the air duct 50. The air duct 50 can be located in the middle of the ceiling region. The interior panelling 40 can be connected to the ceiling assembly 100, for example via the C-rails 140, 150.

As described before, the integrated ceiling assembly 100 includes many functions which can be selected according to requirements of the vehicle. In the exemplary embodiment according to FIG. 4, the ceiling assembly comprises a plurality of supporting elements 110, 130, 140, 150, 160, 170, 180, 190 which provide holding functions (can receive and hold mechanical and/or electrical components) or which provide fastening or mounting functions.

The ceiling assembly 100 can comprise for example one or more cable ducts 110 for housing different types of cables, for example power cables or network cables, like fiber optic cables, for a communication network of the railcar. The ceiling assembly 100 as shown in FIG. 4 comprises two pairs of cable ducts 110 which are arranged at vertical walls 170 of the assembly. The ceiling assembly 100 is configured such that when mounted to the ceiling region of the vehicle body 10 forms the air duct 50. The vertical walls 170 form side walls of the air duct 50, wherein the cable ducts 110 are arranged such that they do not extend inside the cable duct 50 but outside the cable duct 50. The ceiling assembly 100 further comprises air outlets 172 which are arranged between the side walls 170 and the C-rails 130. The air outlets 172 face towards a bottom of the vehicle body 10.

The walls 170 are connected to flanges 180 to mount the ceiling assembly 100 to ceiling structures also referred to as roof structures) of the vehicle body 10. The ceiling assembly 100 can be designed such that the wall 170 and the flange 180 are arranged perpendicular to each other. The ceiling assembly can also be designed such that the wall 170 and the flange 180 are arranged with a different angle to each other, for example smaller or greater than 90°, or the wall 170 and the flange 180 can be arranged in a curve.

In an exemplary embodiment, to ease installation, the ceiling assembly 100 can comprise means 190 for attaching the ceiling assembly 100 to roof structures of the vehicle body before the ceiling assembly 100 can be fastened, for example bolted, on to the roof structures. For example, the means 190 can be configured as a hook in order to hook the ceiling assembly 100 to the roof structures.

The ceiling assembly 100 can further comprise a plurality of C-rails 130, 140 and 150. For example, the ceiling assembly 100 can comprise one or more C-rails 130 to attach different components like stanchions, handrails, and monitors for PIS (Passenger Information System) and the like. The opening of the C-rail 130 can be located such that the different components can be easily mounted to the C-rail 130. The C-rail 130 is designed such that its opening faces outwards with respect to the ceiling assembly 100, for example towards a bottom of the interior room 30.

The ceiling assembly 100 can further comprise one or more C-rails and/or flanges 140, 150 to attach center aisle ceiling panels of the interior room 30 and/or side ceiling panels and/or corner hatches of the interior room 30 of the railway body 10. An opening of the C-rail 140, 150 also faces outwards in respect of the assembly 100, for example towards a sidewall of the interior room 30. FIG. 4 shows that ceiling panels of the interior panelling 40 are mounted to the C-rails 140, 150.

In an exemplary embodiment, the integrated ceiling assembly 100 can comprise a housing 160 to install lights, e.g. LED strips, and optionally speakers, and the like. Furthermore, in order to attach a cover 162, for example a translucent cover, to the housing 160, the ceiling assembly 100 can comprise grooving or recesses. The housing 160 is formed by a top wall 164, wherein the top wall 164 can form a bottom of the air duct 50. Adjacent to the housing 160 on two sides, seen in cross-section perpendicular to a longitudinal direction of the vehicle 10, are the C-rails 130.

FIG. 5 shows a schematic representation of a cross-section through an upper section of a vehicle body 10, for example a railcar body, the cross-section being perpendicular to a longitudinal axis of the vehicle body 10, with an integrated ceiling assembly 100 in accordance with a further exemplary embodiment of the present invention. The vehicle body 10 comprises a body shell 20 with interior panelling 40.

The ceiling assemblies 100 according to FIG. 5 are configured similarly to the ceiling assembly 100 of FIG. 4, but FIG. 5 shows two integrated ceiling assemblies 100 with two separate air ducts 50. Each ceiling assembly 100, when mounted to a ceiling region of the body 10, forms an air duct 50. Since two ceiling assemblies 100 are provided and each assembly forms an air duct 50, the vehicle body 10 comprises two parallel air ducts 50. The air ducts 50 are arranged in parallel with a distance 204 to each other, wherein the distance 204 can vary depending on specific requirements, for example size of the vehicle body 10.

Each ceiling assembly 100 can comprise for example one or more cable ducts 110 for housing different types of cables, for example power cables or network cables, like fiber optic cables, for a communication network of the railcar. Each ceiling assembly 100 as shown in FIG. 5 comprises two cable ducts 110 which are arranged at vertical walls 170 of the assembly 100. The cable ducts 110 are arranged such that they face towards a middle of the ceiling region of the vehicle body 10.

The ceiling assembly 100 is configured such that when mounted to the ceiling region of the vehicle body 10 forms the air duct 50. The vertical walls 170 form side walls of the air duct 50, wherein the cable ducts 110 are arranged such that they do not extend inside the cable duct 50 but outside the cable duct 50 towards a middle of the ceiling. The ceiling assembly 100 further comprises air outlets 172 which are arranged between the side walls 170 and the C-rails 130. The air outlets 172 face towards a bottom of the vehicle body 10.

The walls 170 are connected to flanges 180 to mount the ceiling assembly 100 to ceiling structures (also referred to as roof structures) of the vehicle body 10. The ceiling assembly 100 can be designed such that the wall 170 and the flange 180 are arranged perpendicular to each other. The ceiling assembly can also be designed such that the wall 170 and the flange 180 are arranged with a different angle to each other, for example smaller or greater than 90°, or the wall 170 and the flange 180 can be arranged in a curve.

In an exemplary embodiment, to ease installation, the ceiling assembly 100 can comprise means 190 for attaching the ceiling assembly 100 to roof structures of the vehicle body before the ceiling assembly 100 can be fastened, for example bolted, on to the roof structures. For example, the means 190 can be configured as a hook in order to hook the ceiling assembly 100 to the roof structures.

The ceiling assembly 100 can further comprise a plurality of C-rails 130, 140 and 150. For example, the ceiling assembly 100 can comprise one or more C-rails 130 to attach different components like stanchions, handrails, and monitors for PIS (Passenger Information System) and the like. The opening of the C-rail 130 can be located such that the different components can be easily mounted to the C-rail 130. The C-rail 130 is designed such that its opening faces outwards with respect to the ceiling assembly 100, for example towards a bottom of the interior room 30.

The ceiling assembly 100 can further comprise one or more C-rails and/or flanges 140, 150 to attach center aisle ceiling panels of the interior room 30 and/or side ceiling panels and/or corner hatches of the interior room 30 of the railway body 10. FIG. 5 shows that the interior panelling 40 is mounted to the C-rails 140 and 150. Center aisle ceiling panels are mounted to the C-rails 140 and side ceiling panels are mounted to the C-rails 150.

In an exemplary embodiment, the integrated ceiling assembly 100 can comprise a housing 160 to install lights, e.g. LED strips, and optionally speakers, and the like. Furthermore, in order to attach a cover 162, for example a translucent cover, to the housing 160, the ceiling assembly 100 can comprise grooving or recesses. The housing 160 is formed by a top wall 164, wherein the top wall 164 can form a bottom of the air duct 50. Adjacent to the housing 160 on two sides, seen in cross-section perpendicular to a longitudinal direction of the vehicle 10, are the C-rails 130.

The integrated ceiling assembly 100 can vary in its dimensions, for example in width as indicated by the arrow 200 and in height as indicated by the arrow 202 as shown in FIG. 4. For example, the width 200 and/or height 202 can be changed, i.e. decreased and/or increased, as needed.

As described before, the integrated ceiling assembly can be manufactured as a one-piece component, for example an aluminum extrusion. In another exemplary embodiment, the ceiling assembly 100 can comprise for example two or more extrusion components which are then assembled to each other, for example screwed together. For example referring to FIG. 2, the ceiling assembly 100 can comprise a first extrusion component including the cable ducts 110 and means 120 as supporting elements, a second extrusion component including the C-rail 150 and the housing 160 as supporting elements, and a third extrusion component including the supporting elements C-rails 130 and 140, the wall 170 and the flange 180. These extrusion components are manufactured separately and then assembled together. Connecting elements 210, 220, 230 and 240 may be used if necessary.

Advantages of integrating many ceiling functions into one integrated ceiling assembly are less parts to buy, handle, and assemble; straight surface without gaps, i.e. much less effort to seal of gaps, especially to form the air duct; less effort for assembly; and less effort to align parts. The assembly can be pre-assembled with lights, cables, and cable duct covers in an optimal ergonomic position outside of the vehicle and installed as a whole pre-assembly. The design can be easily adapted for different vehicles even with the very same assembly: flexible length just by cutting the aluminum extrusion accordingly, and flexible aisle ceiling panel and air duct width just by mounting the two extrusions further apart or together. The ceiling assembly can be recycled with very low disassembly effort and a high refund for the aluminum material. The provided ceiling assembly is applicable to different types of vehicles, for example rail cars like streetcars, light rail vehicles, automatic (airport) shuttles, metros, commuter trains, EMUs (Electric Multiple Units), DMUs (Diesel Multiple Unit), coaches, and high speed trains.

While embodiments of the present invention have been disclosed in exemplary forms, it will be apparent to those skilled in the art that many modifications, additions, and deletions, as well as re-arrangement of supporting elements, connecting elements, and other functional elements, can be made therein without departing from the spirit and scope of the invention and its equivalents, as set forth in the following claims.

What is claimed is:

1. A ceiling assembly for a vehicle comprising:
 a one-piece extruded component mountable to a ceiling of a vehicle, wherein in a cross-section through the one-piece extruded component, the one-piece extruded component includes:
  a vertical wall;
  at least one flange extending laterally from the vertical wall, which at least one flange is configured to mount to the ceiling of the vehicle;
  at least one cable duct and at least two C-rails that extend vertically below the at least one flange; and
  a housing configured to receive a lighting installation therein,
  wherein in the cross-section:
   the at least one cable duct includes an opening that faces upwardly; and
   the at least two C-rails include respective openings facing outwardly of the one-piece extruded component;
 a translucent cover mountable across an opening to the housing; and at least one interior paneling configured to mount to at least one of the C-rails in an arrangement in which the at least one interior paneling extends downwardly from the one-piece extruded component along a body shell of an interior room of the vehicle.

2. The ceiling assembly of claim 1, wherein when mounted to the ceiling of the vehicle, the at least one flange is configured to form an upper surface of an air duct of the vehicle.

3. The ceiling assembly of claim 2, wherein the at least one flange is configured to carry a roof insulation when mounted to the ceiling of the vehicle.

4. The ceiling assembly of claim 1, wherein in the cross-section, the one-piece extruded component includes at least four C-rails.

5. The ceiling assembly of claim 2, wherein in the cross-section, the one-piece extruded component includes the air duct with air outlets when mounted to the ceiling of the vehicle.

6. The ceiling assembly of claim 1, wherein the one-piece extruded component is an aluminum extrusion.

7. The ceiling assembly of claim 1, wherein the one-piece extruded component is a plastic extrusion.

8. A vehicle comprising:
a body shell including an interior room and a ceiling;
a ceiling assembly comprising:
a one-piece extruded component, wherein in a cross-section through the one-piece extruded component, the one-piece extruded component includes:
a vertical wall;
at least one flange extending laterally from the vertical wall, which at least one flange is mounted to the ceiling of the vehicle;
at least one cable duct and at least two C-rails, that extend vertically below the at least one flange; and
a housing configured to receive a lighting installation therein,
wherein in the cross-section:
the at least one cable duct includes an opening that faces upwardly towards the ceiling; and
the at least two C-rails include respective openings facing outwardly of the one-piece extruded component;
a translucent cover mounted across an opening to the housing; and
at least one interior paneling mounted to at least one of the C-rails, which interior paneling extends downwardly along the body shell of the interior room of the vehicle.

9. The vehicle of claim 8, wherein in the cross-section, the one-piece extruded component includes at least four C-rails.

10. The vehicle of claim 8, wherein the one of the one-piece extruded component corresponds to a first one of the one-piece extruded component, wherein the ceiling assembly comprises a second one of the one-piece extruded component, wherein the first and second one-piece extruded components are arranged along the ceiling of the vehicle in a longitudinal direction of the vehicle.

11. The vehicle of claim 10, wherein the first and second one-piece extruded components are arranged parallel to each other and form at least one air duct that extends therebetween along the ceiling of the vehicle.

12. The vehicle of claim 11, further comprising an interior paneling connected to and extending between each of the first and second one-piece extruded components.

13. The vehicle of claim 12, wherein the vehicle is a railway vehicle.

* * * * *